(12) United States Patent
Willard et al.

(10) Patent No.: US 6,224,146 B1
(45) Date of Patent: May 1, 2001

(54) SPOILER SUNROOF MECHANISM (75) Inventors: Michael T. Willard, Harrison Township, Macomb County; Robert E. Fallis, III, Rochester Hills, both of MI (US); Christopher J. Sameck, Portland, OR (US)

(73) Assignee: ASC Incorporated, Southgate, MI (US)

( * ) Notice: Subject to any disclaimer, the term of this patent is extended or adjusted under 35 U.S.C. 154(b) by 0 days.

(21) Appl. No.: 09/189,048

(22) Filed: Nov. 9, 1998

(51) Int. Cl.⁷ ....................................................... B60J 7/047
(52) U.S. Cl. ...................... 296/216.03; 296/223; 296/224
(58) Field of Search ......................... 296/216.02, 216.03, 296/223, 224

(56) References Cited

U.S. PATENT DOCUMENTS

| | | |
|---|---|---|
| 3,964,784 | 6/1976 | Prechter . |
| 4,185,868 | 1/1980 | Kaltz et al. . |
| 4,220,368 * | 9/1980 | Ferrigan ................................ 296/215 |
| 4,364,601 * | 12/1982 | Katayama ........................ 296/223 X |
| 4,420,184 | 12/1983 | Kaltz . |
| 4,466,657 | 8/1984 | Kaltz et al. ........................... 296/221 |
| 4,502,726 | 3/1985 | Adams ................................. 296/221 |
| 4,609,222 | 9/1986 | Boots ................................... 296/218 |
| 4,619,480 | 10/1986 | Motoyama et al. .................. 296/217 |
| 4,624,501 | 11/1986 | Niwa et al. ........................... 296/222 |
| 4,629,953 | 12/1986 | Inoue et al. .......................... 318/468 |
| 4,643,478 | 2/1987 | Boots ................................... 296/221 |
| 4,647,106 * | 3/1987 | Furst .................................... 296/223 |
| 4,664,440 | 5/1987 | Kano et al. .......................... 296/214 |
| 4,685,724 | 8/1987 | Niwa ............................... 296/223 X |
| 4,688,848 | 8/1987 | Niwa ............................... 296/223 X |
| 4,730,868 | 3/1988 | Niwa ............................... 296/223 X |
| 4,741,573 | 5/1988 | Yokota ................................. 296/221 |
| 4,746,165 * | 5/1988 | Fuerst et al. .................... 296/223 X |
| 4,830,428 | 5/1989 | Masuda et al. ...................... 296/219 |
| 4,877,285 | 10/1989 | Huyer ............................ 296/223 X |
| 4,913,486 | 4/1990 | Staley et al. ......................... 296/223 |
| 4,929,019 | 5/1990 | Paakkonen et al. ................. 296/223 |
| 5,058,947 | 10/1991 | Huyer ............................. 296/223 X |
| 5,092,651 | 3/1992 | Baldwin et al. ..................... 296/223 |
| 5,185,562 | 2/1993 | Huyer ................................... 318/466 |
| 5,288,125 | 2/1994 | Huyer ............................. 296/223 X |
| 5,358,303 | 10/1994 | Huyer ................................... 296/221 |
| 5,558,388 | 9/1996 | Furst et al. ...................... 296/108 X |
| 5,734,727 | 3/1998 | Flaherty et al. ....................... 381/86 |
| 5,879,049 * | 3/1999 | Sinelli ................................. 296/223 |

FOREIGN PATENT DOCUMENTS

| | | | |
|---|---|---|---|
| 32 11 519 A1 | 10/1983 | (DE) . | |
| 60-197428 | 10/1985 | (JP) . | |
| 61-211127 | 9/1986 | (JP) . | |
| 362034814 * | 2/1987 | (JP) | ................................ 296/216.03 |
| 62-191219 | 8/1987 | (JP) . | |
| 363017114 * | 1/1988 | (JP) | ................................ 296/216.03 |
| 92-299927 | 12/1990 | (JP) . | |
| 402299927 * | 12/1990 | (JP) | ................................ 296/216.03 |

OTHER PUBLICATIONS

ASC Incorporated Drawing for Part No. C–49X5–0001–AXXX dated Mar. 24, 1995 and entitled Housing Assembly—Complete (750).

Photographs of Zani sunroof—Exhibit A (believed to have been offered for sale prior to May, 1997).

Photographs of Webasto aftermarket sunroof—Exhibit B (believed to have been offered for sale prior to May, 1997).

Photographs of Westmont sunroof—Exhibit C (believed to have been offered for sale prior to May, 1997).

* cited by examiner

Primary Examiner—Dennis H. Pedder
(74) Attorney, Agent, or Firm—Harness, Dickey & Pierce, P.L.C.

(57) ABSTRACT

A spoiler sunroof for use in an automotive vehicle includes a scissor linkage assembly and a supplemental linkage. In another aspect of the present invention, lower pivots of the scissor linkage assembly and supplemental linkage are all linearly movable when a sunroof panel is moved from a vent position to an open position.

30 Claims, 8 Drawing Sheets

SPOILER SUNROOF MECHANISM

BACKGROUND AND SUMMARY OF THE INVENTION

This invention relates generally to sunroofs for automotive vehicles and more specifically to a spoiler type sunroof.

There are two main types of conventional automotive vehicle sunroofs. The first type retracts a metal or glass panel from a closed position, generally flush with a stationary roof, to an open position below the stationary roof. This below-roof open position provides improved exterior vehicle aesthetics.

The second common type of sunroof is known as a spoiler sunroof which retracts the moving roof panel from the closed and flush position to an open position at least partially above the exterior surface of the stationary roof. The advantage of spoiler sunroof constructions is the ease of packaging in vehicles having relatively small stationary roofs and having limited interior head room space. Most spoiler sunroofs employ a camming drive mechanism with pins riding along inclined slots for raising and lowering the sunroof panel. Examples of such driving mechanisms are disclosed in U.S. Pat. No. 5,288,125 entitled "Open Roof Construction for a Vehicle" which issued to Huyer on Feb. 22, 1994. Various scissor linkage arrangements have also been employed in traditional spoiler sunroofs. For example, reference should be made to U.S. Pat. Nos. 4,730,868 and 4,688,848, both of which are entitled "Sliding Roof for Automobiles" and issued to Niwa on Mar. 15, 1988 and Aug. 25, 1987, respectively. Japanese Patent Publication No. 2-299927, published on Dec. 12, 1990, and German Patent Publication No. 32 11 519 A1, published on Oct. 6, 1983, also disclose other known scissor linkage arrangements for sunroofs. However, these types of conventional sunroofs often prevent linear movement of the complete scissor linkage assembly or they employ significantly elongated and, thus, difficult to package linkages.

In accordance with the present invention, a preferred embodiment of a spoiler sunroof for use in an automotive vehicle includes a scissor linkage assembly and a supplemental linkage. In another aspect of the present invention, lower pivots of the scissor linkage assembly and supplemental linkage are all linearly movable when a sunroof panel is moved from a vent position to an open position. A further aspect of the preferred embodiment of the present invention does not employ camming slots and cam follower pins to raise and lower the sunroof panel relative to a stationary track such that the lower linkage pivots are generally prevented from vertically moving. Still another aspect of the present invention moves a front linkage and one linkage of the scissor linkage assembly rearward while maintaining a second linkage of the scissor linkage assembly in a stationary fore and aft position, thereby moving the sunroof panel and associated lifting bracketry from a closed position to a vent position. In yet a further embodiment of the present invention, a linearly movable locking structure locks and unlocks from a pair of undercut locks stationarily mounted to each track. A method of operating the sunroof of the present invention is also provided.

The spoiler sunroof of the present invention is advantageous over conventional sunroofs in that the scissor arm and non-camming drive mechanism of the present invention resist collapsing and do not suffer from the usual electric motor amperage spikes commonly associated with inclined camming devices having high frictional resistance. Furthermore, the present invention is advantageous by employing small length and compact linkages which do not need to be moved or secured below the rear stationary roof, thereby allowing for easier aftermarket installation and less head room intrusion inside the automotive vehicle. The lock configuration of the present invention is advantageous over traditional devices in that the present invention promotes front and rear sunroof panel locking through a single linear motion such as to simplify part construction, actuation and locking performance. Additional advantages and features of the present invention will become apparent from the following description and appended claims, taken in conjunction with the accompanying drawings.

BRIEF DESCRIPTION OF THE DRAWINGS

FIG. 3 is a cross sectional view, similar to that of FIG. 2, showing the preferred embodiment spoiler sunroof disposed in a vent position;

FIG. 4 is a cross sectional view, similar to that of FIG. 2, showing the preferred embodiment spoiler sunroof disposed in an open position;

FIG. 6 is a cross sectional view taken along line 6—6 of FIG. 5 showing the preferred embodiment spoiler sunroof disposed in the closed position;

FIG. 8 is a cross sectional view, taken along line 8—8 of FIG. 5, showing the preferred embodiment spoiler sunroof;

DETAILED DESCRIPTION OF THE PREFERRED EMBODIMENT

The preferred embodiment of a spoiler sunroof 21 of the present invention is shown in FIGS. 1–4. Spoiler sunroof 21 is used in an automotive vehicle and includes a slightly curved, glass sunroof panel 23, a pair of extruded aluminum tracks 25, an upper frame 27 and a lower frame 29. Upper and lower frames 27 and 29, respectively, are preferably made from Zytel® plastic which can be obtained from E.I. DuPont Co. Lower frame 29 sandwiches a stationary sheet metal roof 31 against upper frame 27, while a bulb-like weatherstrip 33 is affixed to upper frame 27. A fractional horsepower, direct current, electric motor 35 and associated mounting bracket are secured to a lower side of upper frame 27. A pair of conventional cables 37 (see FIG. 8) are selectively pushed or pulled within guide tubes 39, return tubes held in slot 40 and passageways 41 (also see FIG. 8) of tracks 25 by selective rotation of a driving gear 43 actuated by electric motor 35. Cables 37 are longitudinally rigid but laterally flexible. Furthermore, a sunroof opening is defined by an inner edge of upper frame 27. Frame 27, as well as tracks 25, are ideally suited for aftermarket as well as original equipment factory installations since they can be simply installed from above into the stationary roof opening with minimal intrusion into the passenger compartment below the generally horizontal plane of stationary roof 31.

The structure of the present invention sunroof 21 can best be observed in FIGS. 5–10 and 12–16. A front slide 51 is slidably disposed within a longitudinally oriented channel 53 of track 25. A rear slide 55 is also slidably disposed in channel 53 of track 25 but rearward of front slide 51. Slides 51 and 55 are preferably injection molded from Delrin® 500 polyacetal plastic which can be obtained from E.I. DuPont Co. Front slide 51 has a body with a bifurcated leading end 57 and a bifurcated trailing end 59. A tail 61 of front slide 51 rearwardly and centrally extends from bifurcated end 59 and has an upper surface defined by a first deep trough 62 corresponding with a rear pivot aperture 63, a first peak 65, a second and gradual trough 66 and a rearwardly pointing second peak 67 (see FIG. 12). An integrally molded, circular-cylindrical pin 69 transversely projects from second peak 67 of tail 61. Two sets of flexible fins 71 transversely project from one side of front slide 51 while integrally molded, leaf spring-like sections 73 project from an upper surface and a lower surface of front slide 51 for providing a rattle-free fit in track 25.

Rear slide 55 is primarily bifurcated forward of a pivot aperture 81. An outboard section of rear slide 55 has a wedge-shaped leading end 83 and a pair of flexible and transversely projecting fins 85. An integrally molded, leaf spring-like section 87 is located on an upper surface of an inboard wall of rear slide 55. Section 87 and fins 85 act to snugly fit rear slide 55 in channel 53 of track 25.

A front locking shoe 91 has a pivot 93 laterally projecting inboard and outboard of a front end. A longitudinally elongated slot 95 is disposed within a main body 97 of front locking shoe 91. Slot 95 has a straight forward portion and a declining rearward portion adjacent to a somewhat squared off toe 99. Body 97 and toe 99 of front locking shoe 91 centrally rotate within an open middle section of front slide 51 whereby toe 99 is allowed to selectively project below a bottom of front slide 51. A longitudinally straight slot 101 is also molded into an inboard median body wall 103 of front slide 51 wherein slot 101 is aligned with the straight portion of slot 95 when toe 99 of front locking shoe 91 downwardly projects below front slide 51. A rear locking shoe 105 is constructed and attached to rear slide 55 in a manner similar to that with front shoe 91. However, rear slide 55 does not require a slot 101 like that employed with front slide 51. Locking shoes 91 and 105 are preferably injection molded from polyacetal plastic.

A front linkage 141 has a lower end pivotably journalled about pivot 143 of front slide 51. A longitudinally elongated bracket 145 has a leading end pivotably coupled to an upper end of front linkage 141 at pivot 147. A central link 151 has a lower end pivotably journalled to front slide 51 at pivot 63. An upper end of central link 151 is pivotably coupled to bracket 145 at pivot 153.

A curved rear link 161 has a lower, rear end pivotably journalled to rear slide 55 at pivot 81. A forward and upward end of rear link 161 is pivotably coupled to an intermediate pivot 163 of central link 151. Central and rear links 151 and 161, respectively, define a scissor linkage mechanism 165. Links 141,151 and 161, and bracket 145, are cast from Zamac 5 zinc material with a zinc (0.4–0.6 percent) iron (0.0002 inch) chromate finish. A four bar linkage arrangement is defined by bracket 145, front link 141, front slide 51 and central link 151. Raising and lowering of the four bar mechanism is essentially controlled by the scissor inducing action of rear link 161 as will be described in more detail hereinafter.

A cast aluminum alloy glass attachment bracket 201 is removably secured to bracket 145. Support 201 has a generally L-cross sectional shape, and moves concurrently with bracket 145. Support 201 is adhesively bonded to a frit coated inside peripheral surface of sunroof panel 23. A polyacetal, movable locking structure 221 is mounted between a laterally external face 223 of support 201 and L-shaped fingers 225 depending from support 201. When in a fully closed position, a pair of angled tabs 231 outwardly depending from movable locking structure 221 engage undercut surfaces 233 of respective stationary locks 235. This is shown in FIGS. 2, 5, 9 and 16. Stationary locks 235 have elongated arms 237 extending in a fore and aft longitudinal direction for engaging a channel 239 (see FIGS. 10 and 16) of each track 25. Thus, the engagement of tabs 231 with stationary locks 235 provides fore and aft sunroof panel-to-track retention on both sides of sunroof 21. The link, slides and locks are in mirrored symmetry for both tracks 25.

Figures 1, 2:
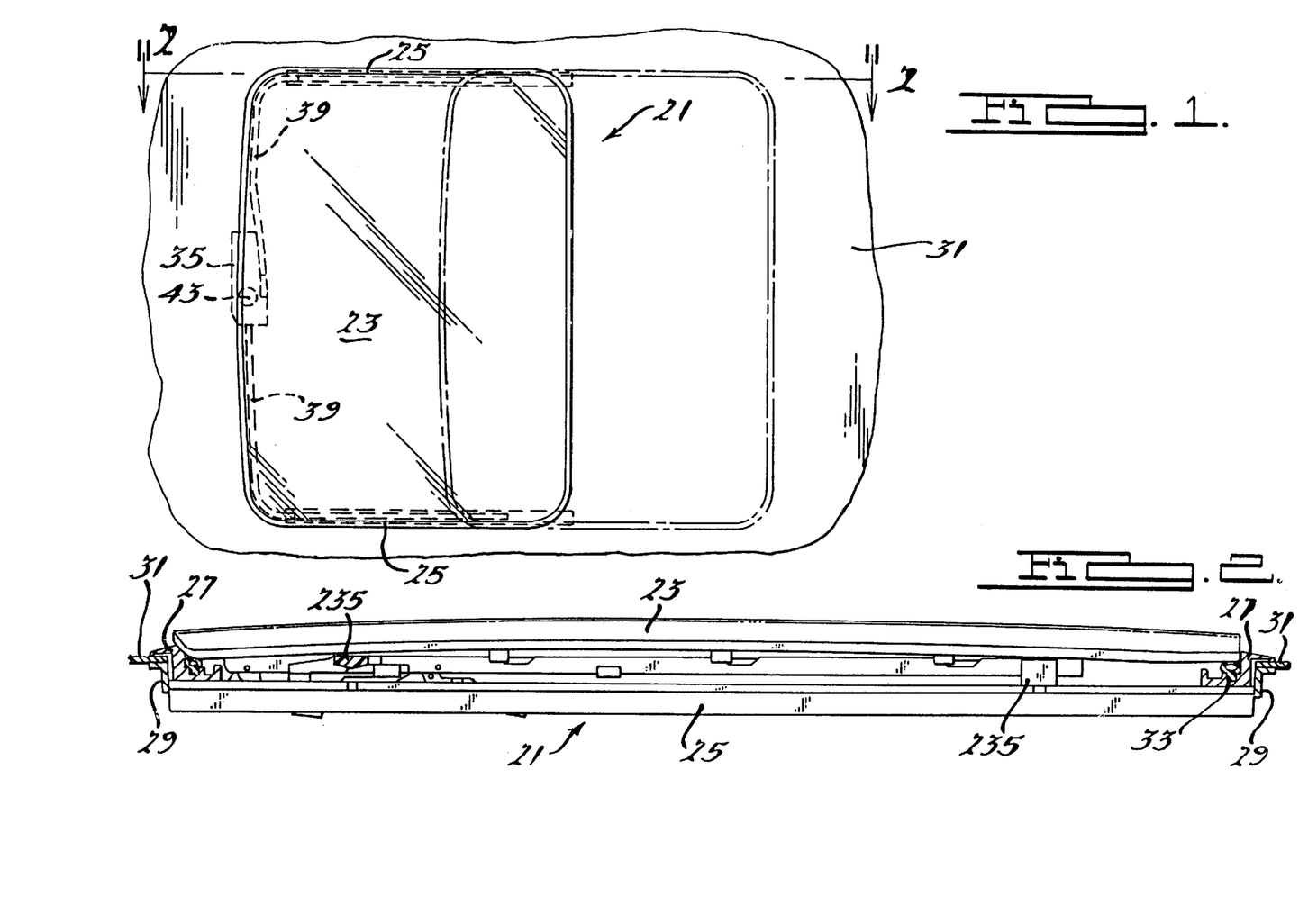
FIG. 1 is a fragmentary top elevational view showing the preferred embodiment of a spoiler sunroof of the present invention relative to a stationary automotive vehicle roof.
FIG. 2 is a cross sectional view, taken along line 2—2 of FIG. 1, showing the preferred embodiment spoiler sunroof disposed in a closed position.
Figure 2:
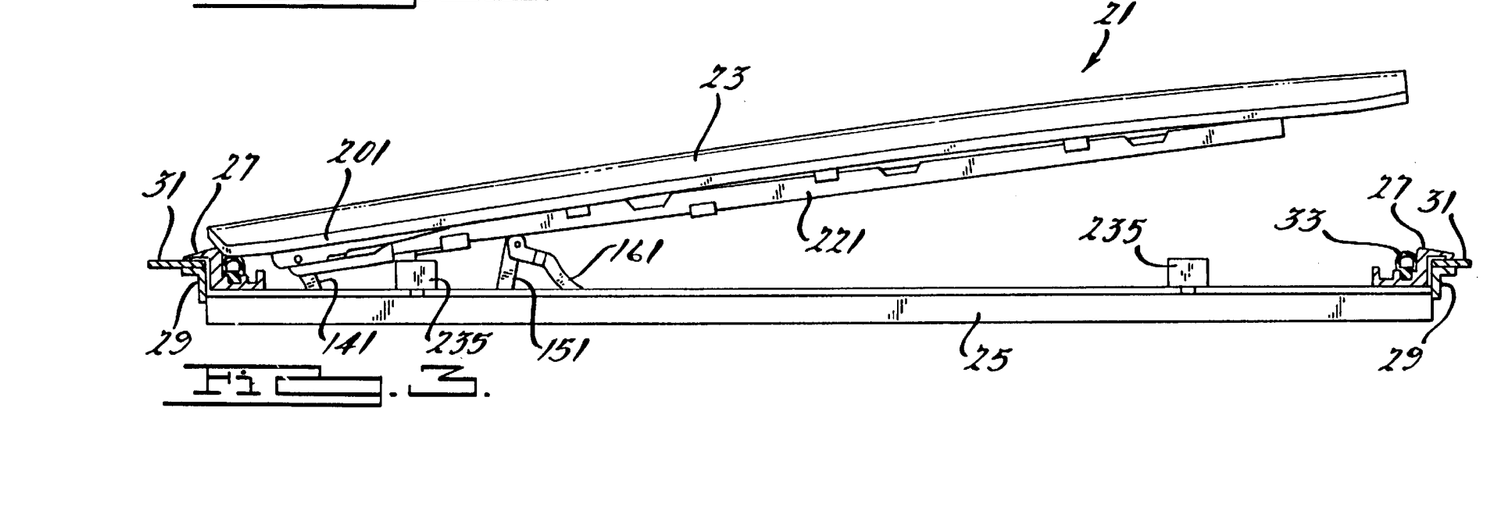
Figures 5, 7:
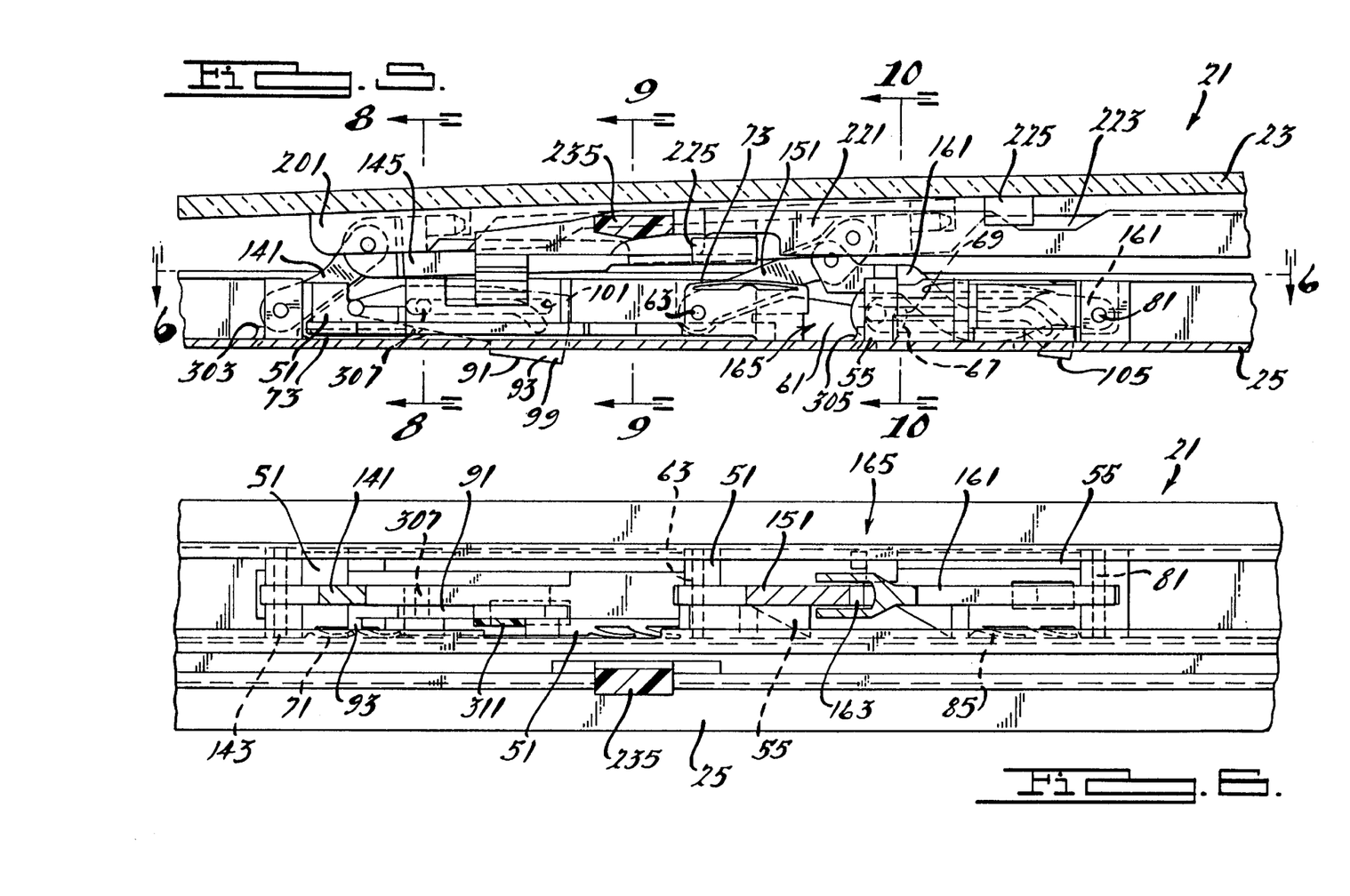
FIG. 5 is an enlarged and fragmentary cross sectional view, similar to that of FIG. 2, showing the preferred embodiment spoiler sunroof disposed in the closed position.
FIG. 7 is a perspective view showing a portion of the preferred embodiment spoiler sunroof disposed in the closed position.
Figure 7:
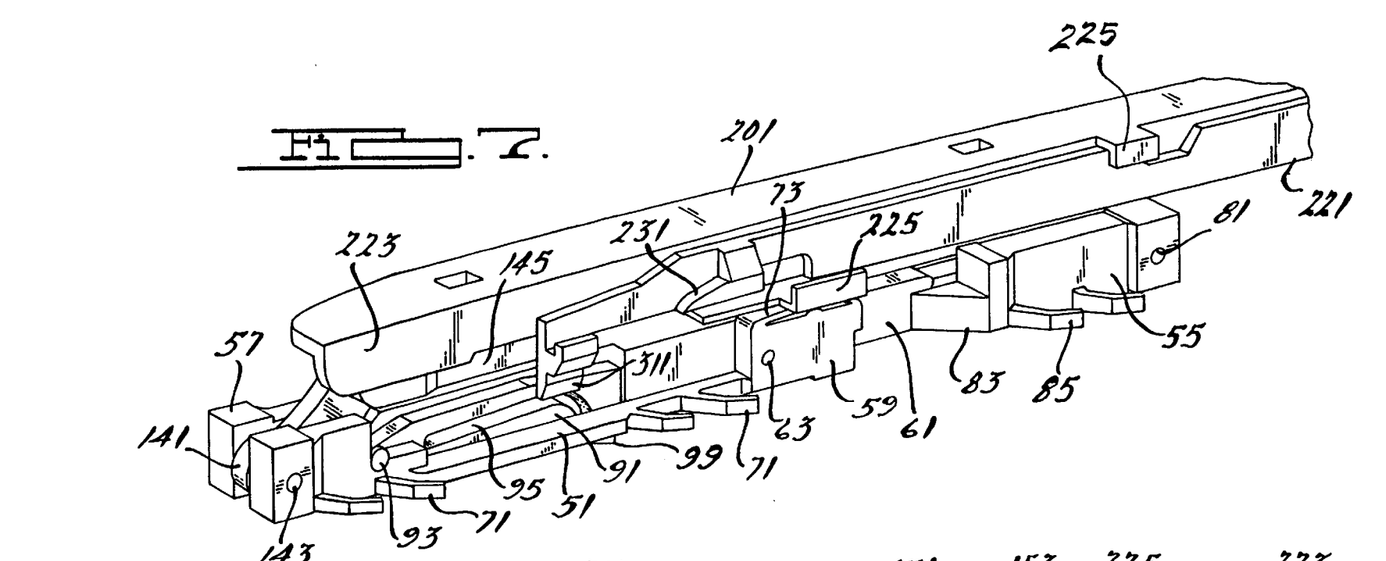
Figures 9, 10:
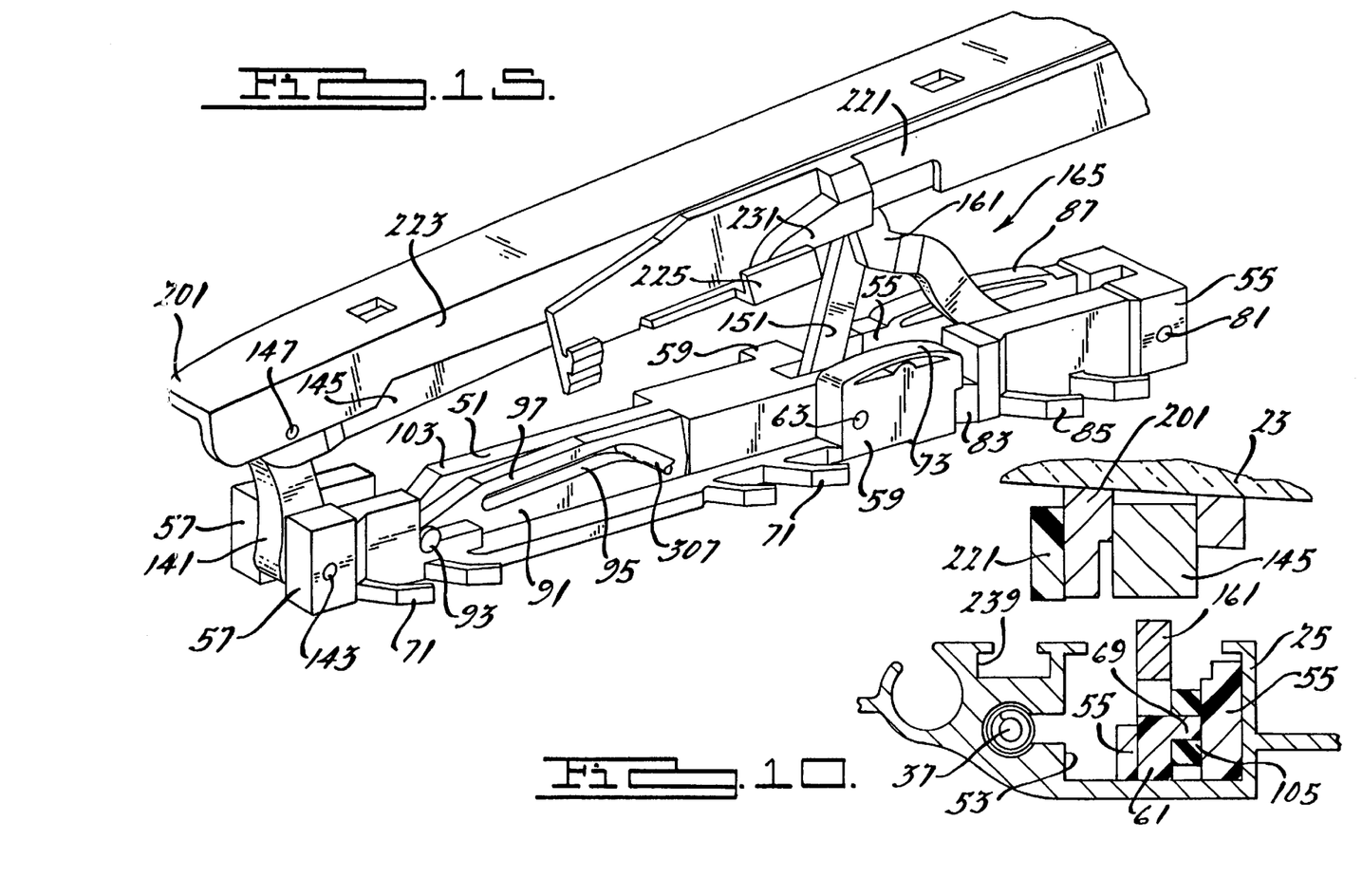
FIG. 9 is a cross sectional view, taken along line 9—9 of FIG. 5, showing the preferred embodiment spoiler sunroof.
FIG. 10 is a cross sectional view, taken along line 10—10 of FIG. 5, showing the preferred embodiment spoiler sunroof.

The operation of the present invention spoiler sunroof 21 will now be described in further detail. Referring to FIGS. 2, 5 and 8, a pin and tab end fitting 301 mounted to a distal end of drive cable 37 is located in a fully retracted position. This causes sunroof panel 23 and its operating mechanism to be disposed in a fully closed position as shown. End fitting 301 is injection molded from a glass filled nylon. In this closed position, toes 99 of locking shoes 91 and 105 downwardly project through respective apertures in a lower surface of track 25. A pin 307 of end fitting 301 acts with slot 95 and slot 101 to maintain front shoe 91 in its track engaging position while pin 69 of tail 61 interacts with the slot of rear shoe 105 to engage track 25. Furthermore, a forward edge of front slide 51 abuts against an upturned flange 303 of track while a forward edge of rear slide 55 abuts against another upturned flange 305 of track 25. The locking mechanisms 221 and 235 are also fully engaged in this closed position.

Figure 11:
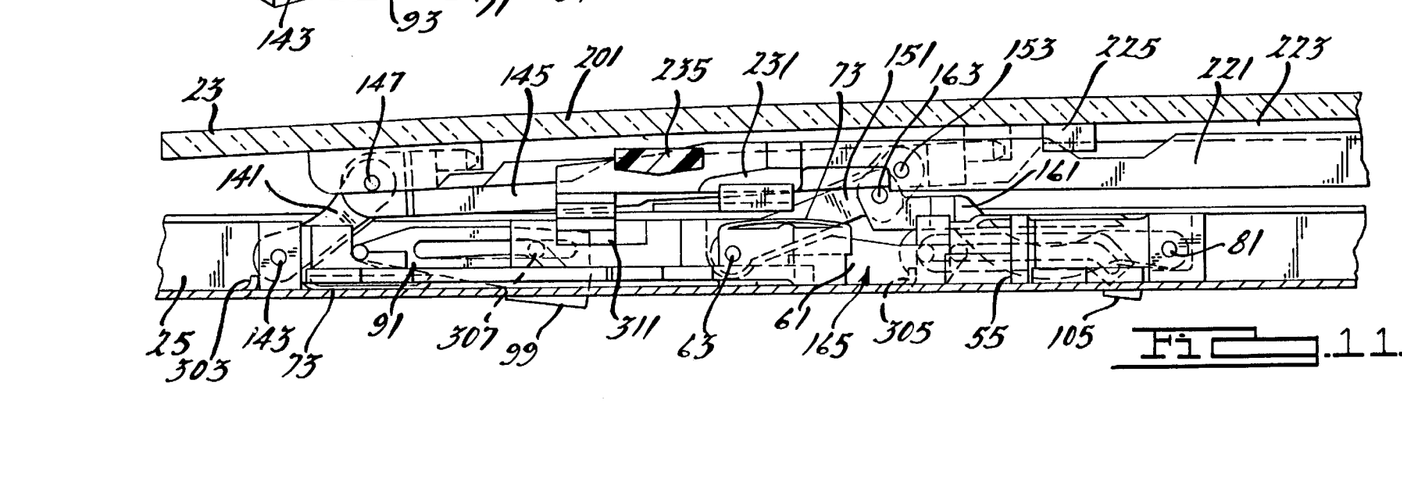
FIG. 11 is an enlarged and fragmentary cross sectional view like that of FIG. 5, showing the preferred embodiment spoiler sunroof disposed in the closed and unlocked position.
Figure 17:
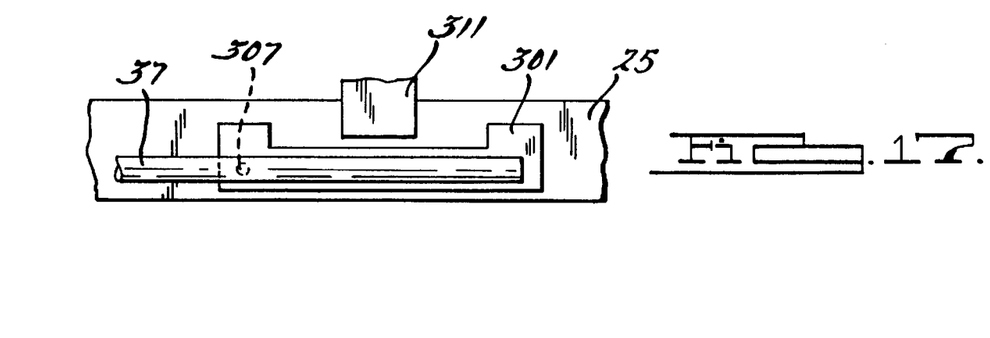
FIG. 17 is a diagrammatic side view, similar to FIG. 5, showing a portion of the preferred embodiment spoiler sunroof disposed in the closed and locked position.

Next, the electric motor advances cable 37 and end fitting 301. This causes pin 307 of end fitting 301 to ride along slots 95 and 101 to the position shown in FIG. 11. A tab associated with end fitting 301 (see FIG. 17) will simultaneously push a downturned element 311 of movable locking structure 221 in a rearward and unlocking direction so as to disengage tabs 231 from stationary locks 235.

Figure 12:
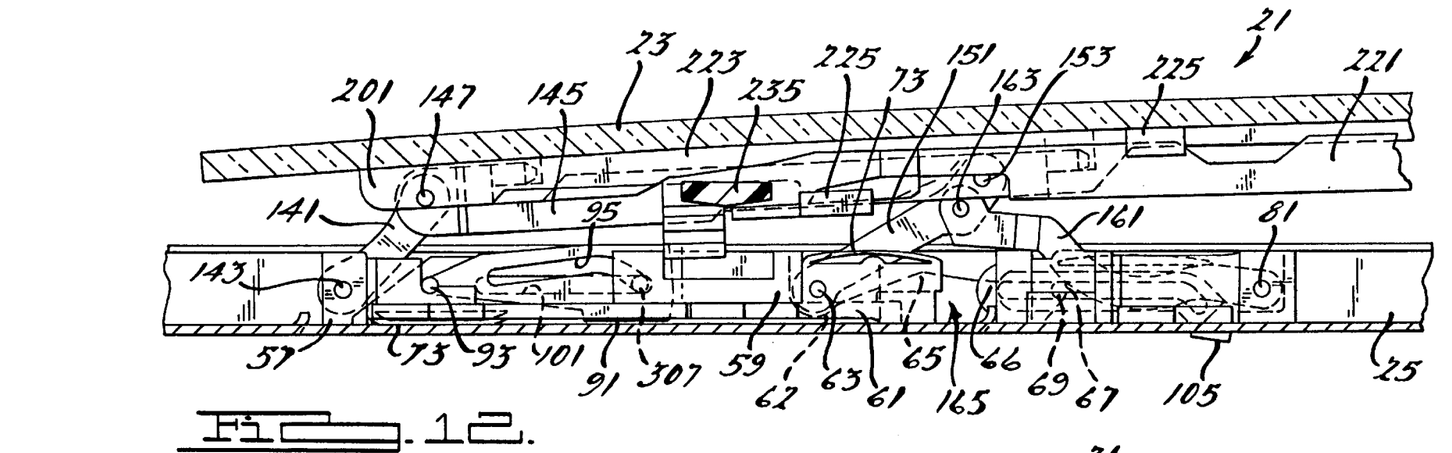
FIG. 12 is an enlarged and fragmentary cross sectional view like that of FIG. 11, showing the preferred embodiment spoiler sunroof disposed in the closed position and a locking shoe disposed in a disengaged position.
Figure 13:
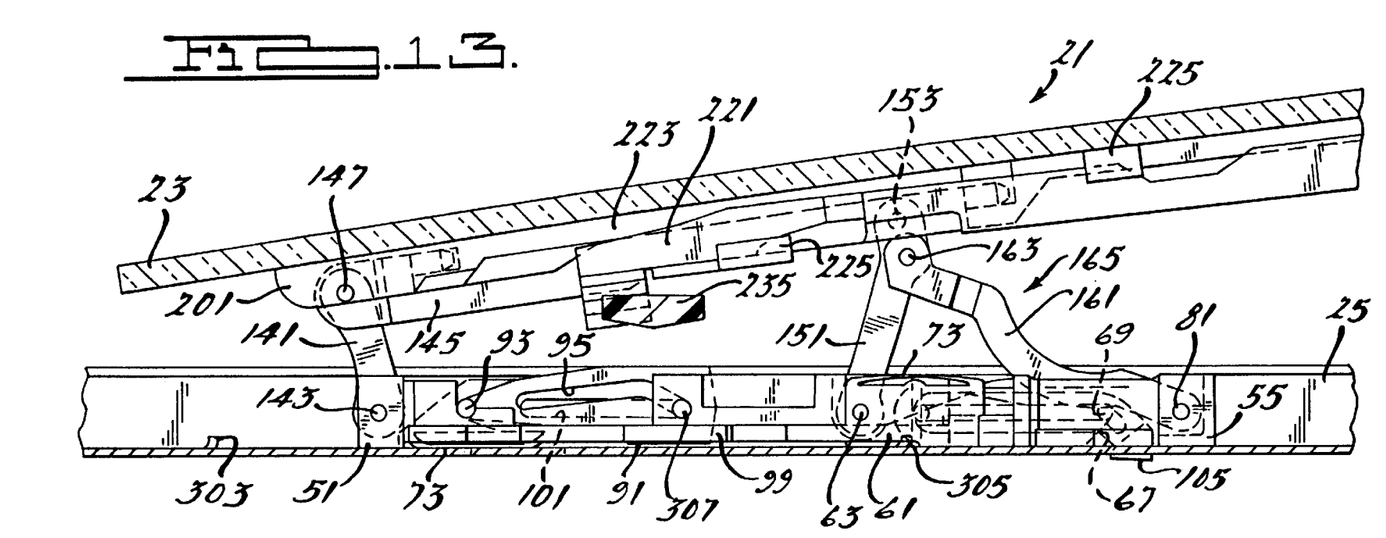
FIG. 13 is an enlarged and fragmentary cross sectional view like that of FIG. 3, showing the preferred embodiment spoiler sunroof disposed in the vent position.

The electric motor subsequently causes pin 307 to move to the position illustrated in FIG. 12 for upwardly pivoting and unlocking front locking shoe 91 from the aperture of track 25. Pin 307 and front slide 51 are then linearly moved rearward to the sunroof venting position of FIGS. 3, 13 and 15, while rear slide 55 is maintained in its position. This relative slide movement causes scissor linkage 165 to vertically raise which, in turn, also pivotally raises front link 141.

Figure 14:
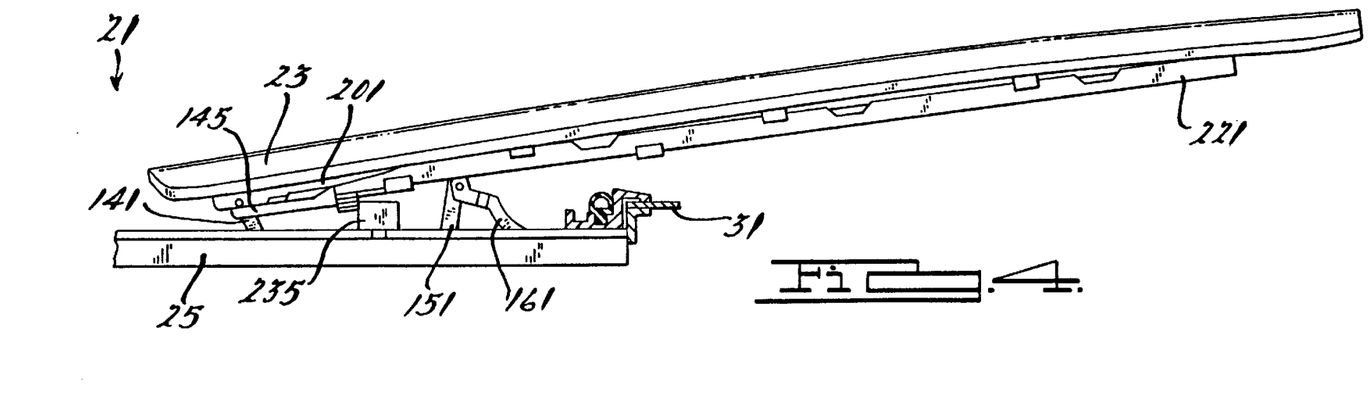
FIG. 14 is an enlarged and fragmentary cross sectional view, like that of FIG. 4, showing the preferred embodiment spoiler sunroof in the open position.
Figures 15, 16:
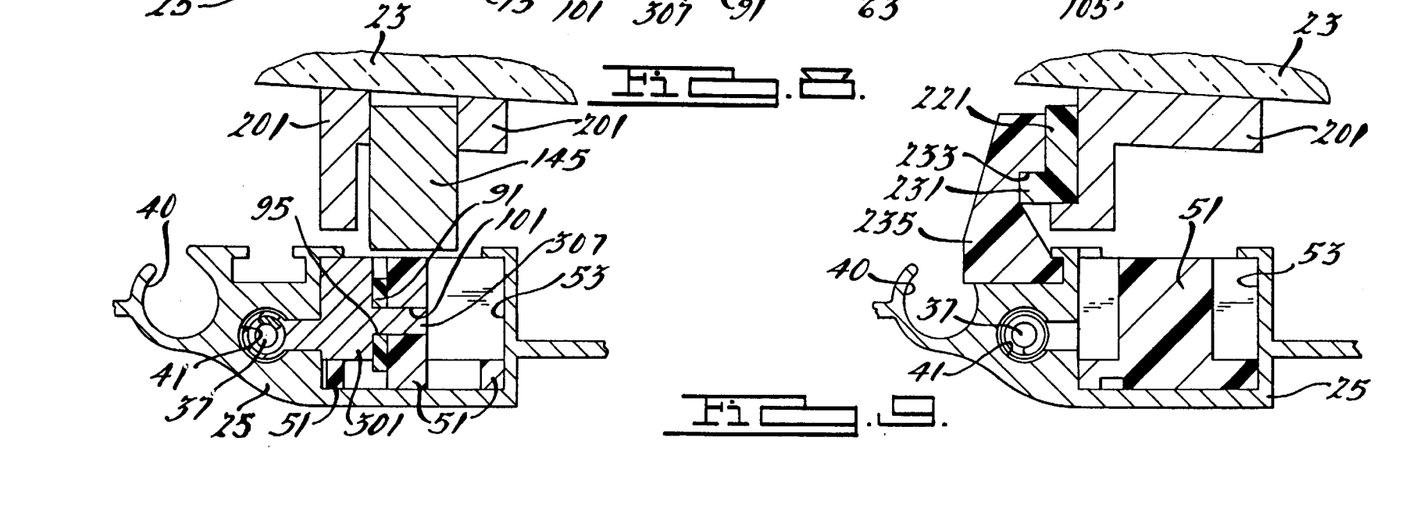
FIG. 15 is a perspective view showing a portion of the preferred embodiment spoiler sunroof disposed in the open position.
FIG. 16 is a perspective view, taken opposite that of FIG. 15, showing a portion of the preferred embodiment spoiler sunroof disposed in the open position.
Figure 16:
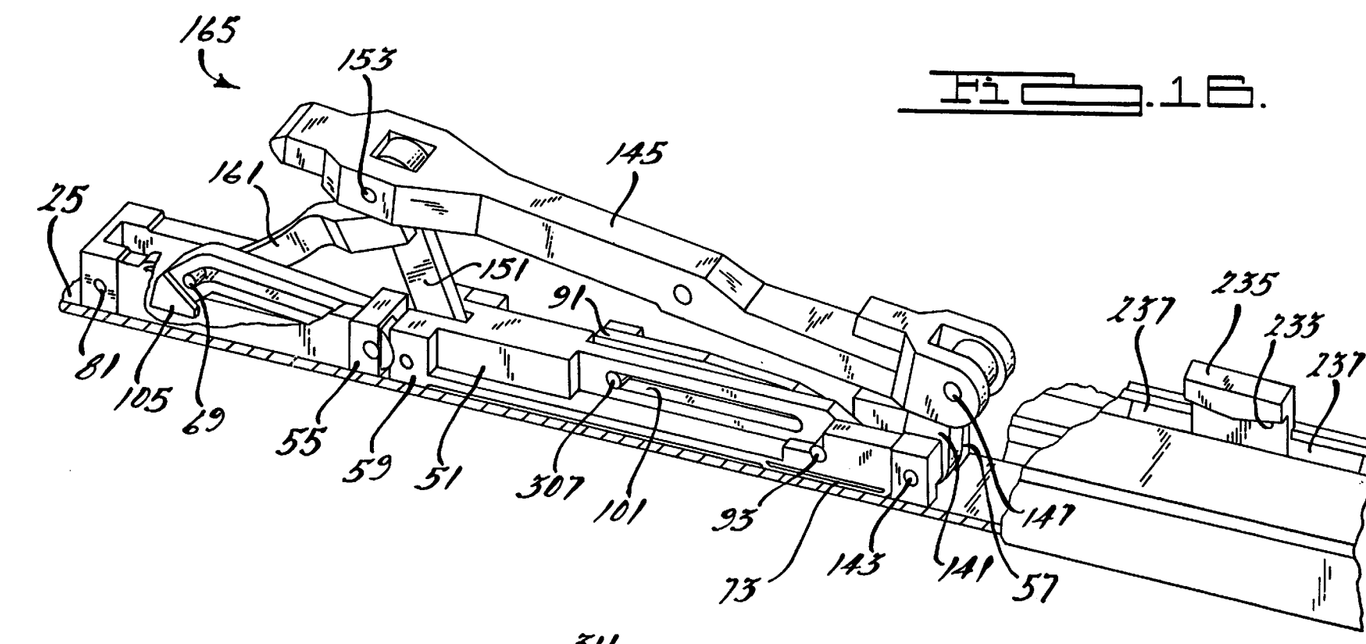

FIGS. 4, 14 and 16 show the subsequent movement, wherein rearward movement of front slide causes its pin 69 to upwardly pivot rear shoe 105, engaged therewith. Thus, rear slide 55 then linearly slides rearward simultaneous with front slide 51 upon further advancing of drive cable 37. The links are maintained in their angularly raised orientation while the entire mechanism and sunroof panel 23 are moved from the vent position to the fully open position. Front slide 51 has a lower channel allowing it to freely pass over upturned flange 305 of track 25. Reversal of electric motor actuation causes a reverse order of the above described mechanism movement. Upturned flanges 303 and 305 stop forward movement of their respective slides during sunroof closure.

It is noteworthy that the use of links and linear slides minimizes motor amperage spikes due to friction and poor mechanical advantages often associated with inclined cams. The linear movement of all link pivots coincidental with the respective slides is beneficial to aftermarket "drop in" installation. Moreover, the relatively short length links provide a small packaging space while maximizing the sunroof opening area.

While the preferred embodiment sunroof mechanism has been disclosed, it should be appreciated that other variations may be employed within the spirit of the present invention. For example, the disclosed locking arrangement may be employed in a below-roof type sunroof. Furthermore, the link shapes and arrangement may also differ as long as the disclosed function is achieved. The slides may also have alternate shapes and additional links can be used. Moreover, the various pins can be integrally or separately formed from the end fitting or slides. Also, a manual crank can be used in place of the electric motor. Additionally, a metal panel can be substituted for the glass sunroof panel. It is intended by the following claims to cover these and any other departures from the disclosed embodiments which fall within the true spirit of this invention.

The invention claimed is:

1. A sunroof for use in an automotive vehicle, said sunroof comprising:
   a sunroof panel movable to closed, venting and open positions, said sunroof panel being disposed in a spoiler-type orientation when in said open position;
   a stationary and elongated track;
   a first member slidably coupled to said track;
   a second member slidably coupled to said track;
   a linkage assembly coupling said second member to said sunroof panel;
   a supplemental linkage coupling said first member to said sunroof panel, said supplemental linkage having a lower pivot axis stationarily fixed relative to said first member;
   said first member, second member, linkage assembly and supplemental linkage all linearly moving relative to said track when said sunroof panel is moved between said vent and open positions; and
   a section of said track operably preventing forward movement of said second member past a predetermined position, said first member being movable past said section of said track due to a clearance condition between said first member and said section of said track.

2. The sunroof of claim 1 wherein said supplemental linkage is located forward of said linkage assembly and has an upper pivot axis stationarily fixed relative to said sunroof panel.

3. The sunroof of claim 1 wherein said linkage assembly includes a controlling link pivotably coupled to said second member.

4. The sunroof of claim 3 wherein said linkage assembly includes a driving link pivotably coupled to said first member, one of said members being independently movable relative to the other, the other of said members being fixed relative to said track, when said sunroof panel is moved between said closed and vent positions.

5. The sunroof of claim 1 further comprising a first locking shoe pivotably coupled to said first member for selectively abutting against a portion of said track to prevent undesired movement of said first member when said sunroof panel is in said closed position.

6. The sunroof of claim 5 further comprising a second locking shoe pivotably coupled to said second member for abutting against a second portion of said track to prevent said second member from moving relative to said track when said sunroof panel is in said closed and vent positions.

7. The sunroof of claim 1 wherein the section of said track is upstanding in a substantially vertical direction.

8. The sunroof of claim 1 further comprising:
   a support affixed to said sunroof panel;
   a bracket detachably engaged with said support; and
   a pivot of said linkage assembly and a pivot of said supplemental linkage mounted to said bracket, movement of said linkages causing movement of said bracket, support and sunroof panel.

9. An automotive vehicle spoiler sunroof comprising:
   a sunroof panel movable to closed, vent and open positions;
   a bracket mounted to said sunroof panel;
   a primary linkage having first and second pivots, said first pivot being coupled to said bracket, said second pivot being linearly movable in a rearward direction when said bracket is moved from said closed position to said vent position, said first pivot being vertically movable when said bracket is moved from said closed position to said vent position;
   a primary slide substantially preventing said second pivot of said primary linkage from moving vertically; and
   a secondary linkage assembly having multiple connected links and first, second and third pivots, said first pivot of said secondary linkage being coupled to a portion of said bracket offset from said first pivot of said front linkage, said second pivot of said secondary linkage assembly being allowed to rotate but otherwise remaining substantially stationary when said bracket moves from said closed position to said vent position, said third pivot of said secondary linkage assembly moving in a substantially horizontal direction when said bracket moves from said closed position to said vent position;
   said second pivot of said primary linkage and said second and third pivots of said secondary linkage assembly all being movable in said substantially horizontal direction when said bracket moves from said vent position to said open position.

10. The sunroof of claim 9 further comprising a track, wherein said third pivot of said secondary linkage assembly always moves simultaneously with said second pivot of said primary linkage after said secondary linkage is unlocked from said track.

11. The sunroof of claim 9 further comprising:
a sunroof track elongated in a fore and aft direction and being stationarily affixed to said vehicle;
said primary slide being a front slide movably coupled to said track, said second pivot of said primary linkage and said third pivot of said secondary linkage assembly being coupled for movement with said front slide; and
a rear slide coupled to said track, said second pivot of said secondary linkage assembly being movable with said rear slide.

12. The sunroof of claim 11 further comprising:
a lost motion coupling;
a driving cable coupled to said front slide by said lost motion coupling;
first and second track receptacles;
a locking shoe operably engaging said first track receptacle thereby securing said front slide relative to said track when said bracket is in said closed position; and
a second locking shoe operably engaging said second track receptacle thereby securing said rear slide relative to said track when said bracket is in said vent position.

13. The sunroof of claim 9 wherein said bracket is elongated in a fore and aft direction and is substantially horizontal when in said closed position, a rear portion of said bracket being raised above a front portion of said bracket when in said open position.

14. A sunroof for an automotive vehicle, said sunroof comprising:
a sunroof track elongated in a substantially fore and aft direction of said automotive vehicle;
at least two locks stationarily mounted to said track and being spaced from each other;
a sunroof panel lifting member;
a driving mechanism operably moving said lifting member relative to said track; and
a structure movable in concert with said lifting member upon actuation of said driving mechanism, formations of said structure serving to engage said stationary locks when said lifting member is located in said closed position;
said structure selectively and linearly moving relative to said lifting member thereby disengaging said formations from said stationary locks to subsequently allow movement of said lifting member and said driving mechanism.

15. The sunroof of claim 14 further comprising:
a sunroof cable movably located in said track;
an interfacing member linearly moving relative to said track in response to actuation of said cable; and
a section of said structure engaging with said interfacing member, movement of said interfacing member causing said structure to move between locking and unlocking positions.

16. The sunroof of claim 15 further comprising a lost motion connection coupling said interfacing member with said driving mechanism such that when said lifting member is in said closed position, actuation of said cable causes said interfacing member to first linearly move said structure to said unlocking position and subsequently move said driving mechanism and lifting member.

17. The sunroof of claim 15 further comprising a locking shoe pivotably coupled to said driving mechanism to selectively secure a portion of said driving mechanism to said track when said lifting member is moved from a first position to a second position, said interfacing member serving to move said locking shoe after moving said structure from said locking position to said unlocking position.

18. The sunroof of claim 14 further comprising an undercut segment located on each of said locks, said undercut segments operably engaging said formations if locking of said sunroof panel lifting member is desired.

19. The sunroof of claim 18 wherein said formations are angled tabs projecting laterally outboard from said structure and said undercut segments project above said track.

20. A sunroof for an automotive vehicle, said sunroof comprising:
a sunroof panel movable to closed, vent and opened positions;
a sunroof track;
a driving mechanism movably coupling said sunroof panel to said track, said driving mechanism including a scissor linkage assembly;
a locking member moving with said sunroof panel to said closed, vent and open positions, said locking member being linearly movable relative to said sunroof panel when said sunroof panel is in said closed position in order to selectively lock and unlock said sunroof panel to said track;
an actuator operably moving said driving mechanism relative to said track, said actuator also operably moving said locking member between locked and unlocked positions relative to said track;
a lost motion device coupling said actuator to said driving mechanism, said actuator operably moving said locking member from a locked position to an unlocked position and then subsequently causing said driving mechanism to move said sunroof panel from said closed position to said vent position; and
a pair of undercut locks stationarily mounted to said track, angled tabs projecting from a side of said locking member being engagable with said undercut locks when said locking member is in said locked position.

21. The sunroof of claim 20 further comprising a stationary roof panel, at least a section of said sunroof panel located above said stationary roof when said sunroof panel is located in said open position.

22. The sunroof of claim 21 wherein said scissor linkage assembly includes a first link and a second link, an end of said second link is coupled to a section of said first link between its pivotal end sections.

23. The sunroof of claim 20 wherein said driving mechanism has pivots, said pivots located adjacent to said track operably move in a substantially horizontal and linear direction when said sunroof panel is moved from said vent position to said open position, and said pivots of said driving mechanism located adjacent to said track are substantially prevented from vertical movement relative to said track when said sunroof panel is moved from said vent position to said open position.

24. The sunroof of claim 20 wherein said actuator is a flexible cable and an electric motor, and said lost motion device includes a rigid pin connected to said cable movable in an elongated slot of said driving mechanism.

25. The sunroof of claim 20 wherein said locks are substantially aligned with each other in a fore and aft direction.

26. An apparatus for use in an automotive vehicle sunroof, said apparatus comprising:

an elongated track;

a slide engaging said track, said slide having a body, a bifurcated portion and a tail, said tail centrally and longitudinally extending from said body adjacent to said bifurcated portion;

a projection laterally extending from said tail;

a movable member having a first slot engaging said projection; and a first link pivotably coupled to said bifurcated portion of said slide;

said slide operably moving relative to said track.

27. The apparatus of claim 26 further comprising:

a second link coupled to said slide, at least one of said links being part of a scissor-type linkage mechanism;

a second slot located in said body; and a locking shoe pivotally coupled to said body, an end of said shoe selectively engaging an aperture in said track.

28. A method of operating a sunroof having a sunroof panel, a front linkage, an articulated linkage assembly having multiple links, a front slide, a rear slide and a track, the method comprising:

(a) moving the front slide relative to the track while maintaining the position of the rear slide relative to the track when the panel is moved from a substantially horizontal closed position to a tilted position;

(b) moving the first and second slides in the same direction when the panel is moved from the tilted position to an open position;

(c) vertically moving a front portion of the panel relative to the track by rotating the front linkage coupled to the front slide;

(d) vertically moving a rear portion of the panel by rotating portions of the articulated linkage assembly in response to step (a);

(e) rearwardly moving the front linkage and all of the articulated linkage assembly in response to step (b);

(f) preventing a first pivot axis of the articulated linkage assembly from moving relative to the front slide;

(g) preventing a second pivot axis of the articulated linkage assembly from moving relative to the rear slide;

(h) preventing a third pivot axis of the articulated linkage assembly from moving relative to the panel;

(i) pivoting the front linkage about fourth and fifth axes stationarily positioned relative to the front slide and the panel, respectively;

(j) pivoting the articulated linkage assembly about the first, second and third pivot axes which are stationarily positioned relative to the front slide, rear slide and panel, respectively; and (k) coupling together the multiple links of the articulated linkage assembly at a seventh pivot axis stationarily positioned relative to the articulated linkage assembly.

29. The method of claim 28 wherein the open position is at least partially above a substantially horizontal plane defined by the closed position.

30. The method of claim 28 further comprising moving the fourth pivot axis with the front slide, and preventing the fourth pivot axis from substantially moving in a vertical direction relative to the track.

* * * * *